United States Patent [19]

Huang

[11] Patent Number: 5,650,824
[45] Date of Patent: Jul. 22, 1997

[54] METHOD FOR MPEG-2 4:2:2 AND 4:2:0 CHROMA FORMAT CONVERSION

[75] Inventor: Si Jun Huang, Singapore, Singapore

[73] Assignee: Matsushita Electric Industrial Co., Ltd., Osaka, Japan

[21] Appl. No.: 502,278

[22] Filed: Jul. 13, 1995

[30] Foreign Application Priority Data

Jul. 15, 1994 [JP] Japan .................................. 6-163900

[51] Int. Cl.[6] .............................. H04N 7/01; H04N 11/22
[52] U.S. Cl. ................................... 348/453; 348/450
[58] Field of Search ................................. 348/441, 443, 348/444, 446, 448, 449, 450, 554, 555, 557, 558, 392, 398, 453, 455, 456; H04N 7/01, 11/22

[56] References Cited

U.S. PATENT DOCUMENTS

| | | | |
|---|---|---|---|
| 5,278,647 | 1/1994 | Hingorani et al. | 348/390 |
| 5,412,428 | 5/1995 | Tahara | 348/396 |
| 5,457,498 | 10/1995 | Hori et al. | 348/446 |
| 5,489,947 | 2/1996 | Cooper | 348/589 |

OTHER PUBLICATIONS

"Revised Text for ITU–T Recommendation H.262 ISO/IEC 13818–2:1995, Information technology–Generic coding of moving pictures and associates audio information: Video", ISO/IEC JTC 1/SC 29 N 0981 REV, Mar. 31, 1995.

"Encoding Parameters of Digital Television for Studio", Digital Methods of Transmitting Television Information, CCIR Recommendation 601, pp. 271–283, (1982).

"Final Text for ISO/IEC 11172-2, Information technology —Coding of moving pictures and associated audio for digital storage media at up to about 1,5 Mbit/s –Part 2: Video", ISO/IEC JTC 1/SC 29 N 313, (May 20, 1993).

"Test Model 5", ISO/IEC JTC1/SC29/WG11 MPEG93/457, Document AVC–491, Version 1, pp. 15–16, (Apr. 1993).

"Digital Signal Processing", Alan V. Oppenheim and Ronald W. Schafer, pp. 236–239, (1975).

*Primary Examiner*—Michael H. Lee
*Attorney, Agent, or Firm*—Ratner & Prestia

[57] ABSTRACT

A chroma format conversion method that determines whether chroma format data to be converted is interlaced data or not. When the chroma format data is non-interlaced data the chroma format data is converted using a filter for non-interlaced. When the chroma format data is interlaced data it is determined whether the chroma format data is odd field data or even field data. When the chroma format data is odd field data the chroma format data is converted using a filter for odd field and when the chroma format data is even field data the chroma format data is converted using a filter for even field.

18 Claims, 7 Drawing Sheets

Fig. 1

*4:2:2 Format*                       *4:2:0 Format*

```
51            53                             57
  @   Y     @   Y            55  Y     Y    Y    Y
52            54                 
  @   Y     @   Y            59  C  58   C

@   Y     @   Y            56  Y     Y    Y    Y

@   Y     @   Y                Y     Y    Y    Y
                                 C        C
                                 Y     Y    Y    Y
```

Note:    Y --- *Luma sample*
               C --- *Chroma sample*
               @ --- *Luma and chroma sample cosite*

Fig. 2

Note:   • -- *chroma sample*

Fig. 3

| 4:2:2 | | | 4:2:0 | |
|---|---|---|---|---|
| Samples | | Filter | samples | |
| $f(y-2)$ | O | | | |
| | | | C | |
| $f(y-1)$ | E | a | | |
| $f(y)$ | O | b | | |
| | | | >----------> C | $g(y') = g((y+1)/2)$ |
| $f(y+1)$ | E | b | | ($y$=odd value) |
| $f(y+2)$ | O | a | | |
| | | | C | |
| $f(y+3)$ | E | | | |

Note:
- E --- Even line sample
- O --- Odd line sample
- C --- 4:2:0 chroma sample
- y --- Vertical coordinate in the 4:2:2 picture
- y' --- Vertical coordinate in the 4:2:0 picture

Fig. 4

| 4:2:0 | | | | 4:2:2 | |
|---|---|---|---|---|---|
| Samples | Filter 1 | Filter 2 | | Odd field | Even field |
| | I | | | O | |
| $f(y-1)$ | C | a | | | E |
| | I | b | a | | |
| | | >------------> | | O  $g(y'O) = g(2y-1)$ | |
| $f(y)$ | C | b | b | | |
| | | | >---------------> | | E  $g(y'E) = g(2y)$ |
| | I | a | b | | |
| $f(y+1)$ | C | | a | O | |
| | | | | | E |

Note:
- I --- linear interpolated sample.
- y'E --- Vertical coordinate for even field.
- y'O --- Vertical coordinate for odd field.

Fig. 5

Note: $C_O$ --- The odd sample of 4:2:0 picture subsampled from odd samples of 4:2:2 interlaced picture.

Fig. 6

| 4:2:2 | | | 4:2:0 | |
|---|---|---|---|---|
| Sample | Filter | | Sample | |
| | | | $C_E$ | |
| f(y-4) E | | | | |
| I | | | | |
| f(y-2) E | a | | | |
| I | b | | | |
| | >----------> | $C_E$ | $g(y') = g(y/2+1)$ | |
| f(y) E | b | | $(y = 2, 6, 10, ... )$ | |
| I | a | | | |
| f(y+2) E | | | | |
| I | | | | |
| | | | $C_E$ | |
| f(y+4) E | | | | |

Note: $C_E$ --- The even sample of 4:2:0 picture subsampled from even samples of 4:2:2 picture.

Fig. 7

| 4:2:0 | | | 4:2:2 |
|---|---|---|---|
| Sample | Filter 1 | Filter 2 | Sample |
| f(y-2) O | | | |
| | | | $C_O$ |
| f(h1) I | a | | |
| f(h2) I | b | | |
| | >--------------------> | $C_O$ | $g(y') = g(2y-1)$ |
| f(y) O | b | a | |
| | | | $(y = 1, 3, 5,...)$ |
| f(h3) I | a | b | |
| | >------------> | $C_O$ | $g(y'+2) = g(2y+1)$ |
| f(h4) I | | b | |
| f(h5) I | | a | |
| | | | $C_O$ |
| f(y+2) O | | | |

METHOD FOR MPEG-2 4:2:2 AND 4:2:0 CHROMA FORMAT CONVERSION

BACKGROUND OF THE INVENTION

1. Industrial Field of Utilization

The present invention relates to vide data compression based on the MPEG-2 international standard, specifically to the method of chroma format conversion that conforms to the definition of the CCIR 4:2:2 color format and MPEG-2 4:2:0 color format.

2. Background and Prior Art

The MPEG-2 international standard has being developed for the generic coding of moving pictures and associated audio. The supported chroma formats for the digital video are 4:4:4, 4:2:2 and 4:2:0 as defined in the MPEG-2 Draft International Standard ISO/IEC JTC1/SC29 WG11/702, "Information Technology—Generic Coding of Moving Pictures and Associated Audio" which is incorporated herein by references. For the applications of the main profile of the MPEG-2 international standard, the input and output format of the encoder and decoder are defined as 4:2:0 format. This implies that the chroma format conversion is necessary when the original input source picture is not in 4:2:0 format and when the output requirement is not in 4:2:0 format either.

The chroma format conversion between 4:4:4 and 4:2:2 are defiend in CCIR Recommendation 601, "Encoding Parameters of Digital Television for Studio" which is incorporated herein by reference. However, the conversion between 4:2:2 and 4:2:0 formats are not specified in the MPEG-2 international standard. This is because the chroma format conversion is considered as either pre- or post-processing with respect to the MPEG-2 coding process. The MPEG-2 does not intend to define any pre- and post-processing techniques. The room is left for individual application implementer to define their proprietary techniques. In fact, there was a set of filters ever defined in ISO/IEC JTC1/SC29/WG11/N0400, "Test Model 5" which is incorporated herein by reference in the MPEG-2 development stage.

However that set of filters does not conform to the finalised 4:2:0 format definition. We will make use of that set of filters as a reference to evaluate the effect of this invention in Section 3.7.

The lack of correct definition for the conversion of 4:2:2 to and from 4:2:0 chroma format does not mean that this converison is not important. In fact it is required that the chroma format shall conform to the definition as defined in the MPEG-2 international standard. This ensures the picutre coding quality, especially in applications where the cascade coding technique is used. Therefore, and efficient chroma conversion method is needed for the conversion of 4:2:2 to and from 4:2:0 format and the method has to be conformed to the definition of both formats as specified in the MPEG-2 international standard.

SUMMARY OF THE INVENTION

The present invention relates to a chroma format conversion method which determines whether chroma format data to be converted is interlaced data or not interlaced data. When the chroma format data is non-interlaced data, the chroma format data is converted using a filter for non-interlaced data. When the chroma format data is interlaced data, it is determined whether the chroma format data is odd field data or even field data. When the chroma format data is odd field data, the chroma format data is converted using a filter for odd field. When the chroma format data is even field data, the chroma format data is converted using a filter for even field.

This invention is therefore specifically to provide a set of pre- and post-filters to fulfill this chroma format conversion operation with strict conformance to the definitions of the two chroma formats.

Since there exists two commonly used raster scanning formats for the digital video signal besides difference of chroma formats, they affect the chroma conversion process and should be treated separately. Pictures generated from these two raster scanning formats are referred to as interlaced or non-interlaced picture according to whether the scan is done in interlaced mode or non-interlaced mode. Therefore, there are following four kinds of filters to be designed and claimed in this invention.

1) Pre-filter to subsample 4:2:2 to 4:2:0 format for non-interlaced picture.

A pro-filter will be designed to subsample (reduce) the 4:2:2 chroma samples in vertical direction by a factor 2 so as to obtain the 4:2:0 chroma samples. This filter is designed based on the non-interlaced picture and thus shall be applied only to non-interlaced picture.

2) Post-filter to upsample 4:2:0 to 4:2:2 format for non-interlaced picture.

A post-filter will be designed to upsample (interpolate) the 4:2:0 chroma samples in vertical direction by a factor of 2 so as to obtain the 4:2:2 chroma samples. This filter is designed based on the non-interlaced picture and thus shall be applied only to non-interlaced picture.

3) Pre-filter to subsample 4:2:2 to 4:2:0 format for interlaced picture.

A pre-filter will be designed to subsample the 4:2:2 chroma samples in vertical direction by a factor of 2 so as to obtain the 4:2:0 chroma samples. This filter is designed based on the interlaced picture and thus shall be applied only to interlaced picture.

4) Post-filter to upsample 4:2:0 to 4:2:2 format for interlaced picture.

A post-filter will be designed to upsample the 4:2:0 chroma samples in vertical direction by a factor of 2 so as to obtain the 4:2:2 chroma samples. This filters is designed based on the interlaced picture and thus shall be applied only to interlaced picture.

Figure 1:
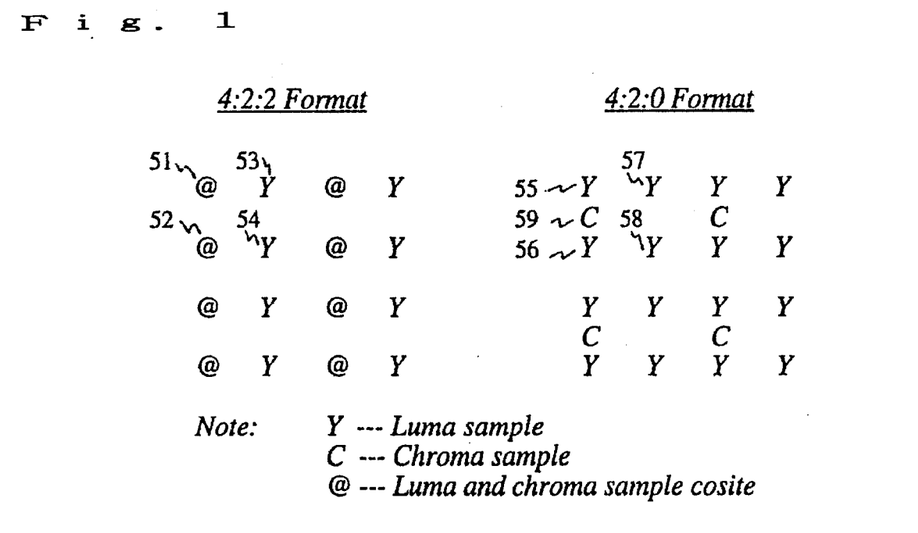
FIG. 1 provides the definition of the 4:2:2 and 4:2:0 chroma formats with respect to the corresponding luma samples. The left side is the 4:2:2 format and the fight side is the 4:2:0 format.

Before disclose the means of solving the problem, it would be helpful to examine the definitions of 4:2:2 and 4:2:0 formats. FIG. 1 shows the two definitions. For the 4:2:2 chroma format, there are two chroma samples corresponding to each four adjacent square shaped luma samples. The positions of the two chroma samples are cosited, i.e., located at the same raster position, with the two left luma samples of the four square shaped luma samples. As an example, the samples labeled (51), (52), (53) and (54) form the said four square shaped luma samples with cosited chrome samples at position (51) and (52). For the 4:2:0 chroma format, there is only one chrome sample for each four square shaped luma samples and the chrome sample is situated at the middle of the two left luma samples of the four square shaped luma samples. This is illustrated in FIG. 1. The samples (55), (56), (57) and (58) form the four square shaped luma samples with a chrome sample (59) in the middle of the two left luma samples (55) and (56). Therefore, the differences of the two chrome formats are two: firstly the number of chrome samples for every four square shaped luma samples, secondly, the position of the chrome samples with respect to the four square shaped luma samples.

To convert the 4:2:2 chrome format to 4:2:0 format, the chrome samples shall be first subsampled by a factor of 2 in vertical direction, then the remaining sample shall be shifted half an luma sample distance down.

To convert 4:2:0 chrome format to 4:2:2 format, the chrome sample shall be upsampled by a factor of 2 in vertical and then the two chrome samples shall be shifted half a sample distance up to same vertical position of the luma samples.

The subsampling and upsampling are implemented by simply dropping one chrome sample or interpolating linearly one chrome sample. In order to reduce the affection of noise, a low pass filter is usually used to filter out the high frequency noise.

The chrome sample position shifting can be implemented by a linear phase FIR filter. According to "Digital Signal Processing", written by Alan Oppenheim published in 1975 which is incorporated herein by reference, a phase shift of $$\frac{N-1}{2}$$

sampling distance can be provided by a FIR filter with the following characteristic:

$$h(n)=h(N-1-n)$$

Where N is the number of sampling points of the filter. In other words, it is the number of taps of the filter. It can be thus called an N-tap FIR filter. This characteristic means the FIR filter shall be symmetrical with respect to its sample center. If N is an even value, the phase shift $$\frac{N-1}{2}$$

is not an integer and it contains a half sample distance shifting that we desired.

Figure 2:
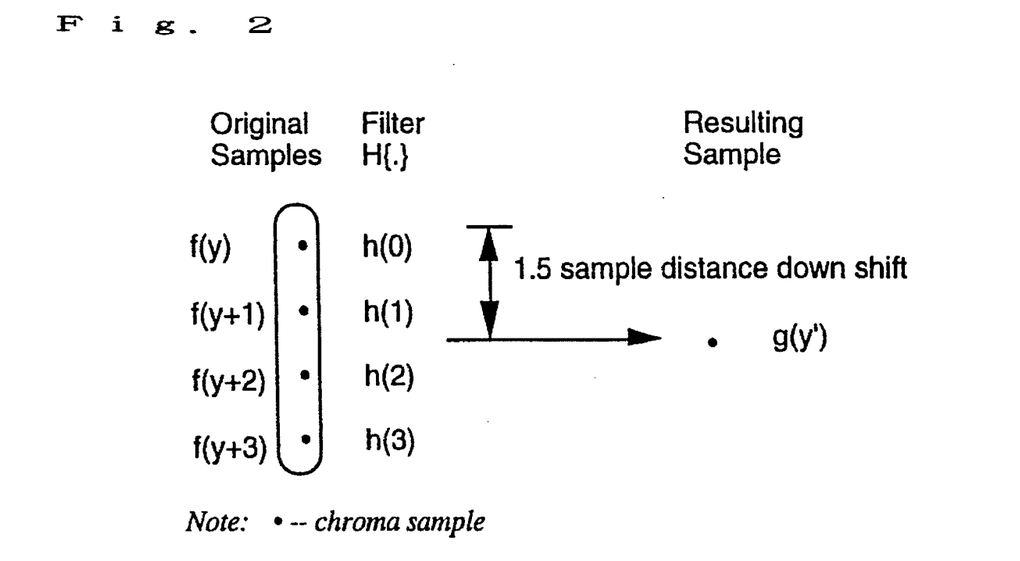
FIG. 2 illustrates the phase shifting operation of a 4-tap symmetrical filter. The filter shifts f(y) down by a 1.5 sample distance.

Take N=4 as an example, FIG. 2 shows the phase shifting operation. The original sample, which is denoted as f(y), is filtered by a 4-tap symmetrical filter H{h(0), h(1), h(2), h(3)}. Ths resulting sample, which is denoted as g(y'), is shifted 1.5 sample distance down with res-pect to the vertical position of f(y), i.e., y'=y+1.5. If we consider the f(y+1) as the original sample to be shifted, then g(y') has half a sample distance down shift with respect to the f(y+1), i.e., y'=(y+1)+0.5. If we consider the f(y+2) as the original sample to be shifted, then g(y') has half a sample distance up shift with respect to the f(y+2), i.e., y'=(y+2)−0.5. Therefore, by placing the 4-tap symmetrical filter at different position of the original chroma grid, half a sample distance up or down shifting can be realised. This is the mechanism; used in the design of the filters of this invention.

Operation of the Invention

The operations of chroma format conversions are not the same for interlaced and non-interlaced pictures. They shall be treated separately.

The filter used in this specification will be a 4-tap symmetrical linear phase FIR filter, it can be represented as:

$$F = \begin{pmatrix} a \\ b \\ b \\ a \end{pmatrix}$$

1. Non-interlaced picture

For non-interlaced picture, the process of subsampling and upsampling can be carreid out directly without considering the difference of odd field and even field of a vide frame.

1) 4:2:2 to 4:2:0 subsampling

Figure 3:
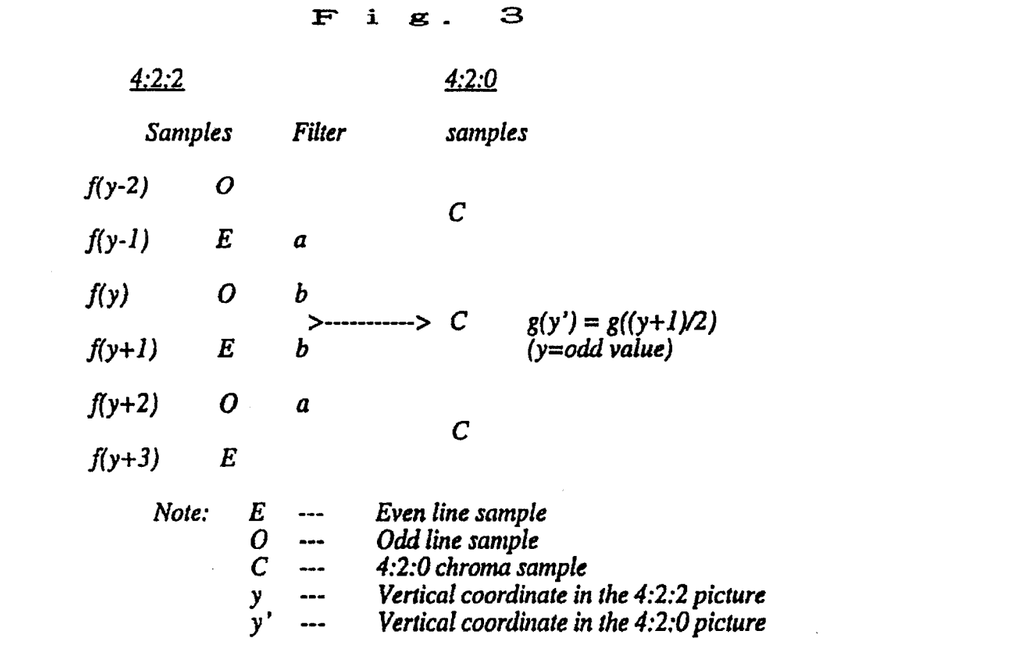
FIG. 3 illustrates the subsampling process for a non-interlaced picture. A 4-tap symmetrical filter is used to shift the sample by half a luma sample distance down with respect to the 4:2:2 picture sample f(y).

The subsampling operation from 4:2:2 to 4:2:0 chroma format for non-interlaced picture is shown in FIG. 3. The 4:2:0 sample g(y') is derived from four chroma samples, f(y−1), f(y), f(y+1) and f(y+2). The position of g(y') is half a luma sample distance down with respect to the chroma sample position of f(y) in 4:2:2 picture. Due to the subsampling operation requirement, y could only take odd values so that the 4:2:0 picture is subsampled from 4:2:2 picture by a factor of 2. The subsamples value of g(y') could be calculated by the following formula.

$$g(y') = g\left(\frac{y+1}{2}\right) = a*f(y-1) + b*f(y) + b*f(y+1) + a*f(y+2)$$

for $(y = 1, 3, 5 \ldots)$

This can be expressed as a 4-tap filter mask shown below:

| | |
|---|---|
| y − 1 | a |
| y | a |
| y + 1 | b |
| y + 2 | a |

→ y'

In the actual application of this filter mask, the result of convolution of this filter mask with picture samples shall be further divided by the sum of the elements of the filter mask. In this case, the said sum equals to 2a+2b. This is to guarantee that the picture energy remains unchanged from the filtering operation. This operation is needed for all the filtering operation discussed throughout this specification and it will not be mentioned explicitly elsewhere.

2) 4:2:0 to 4:2:2 upsampling

Figure 4:
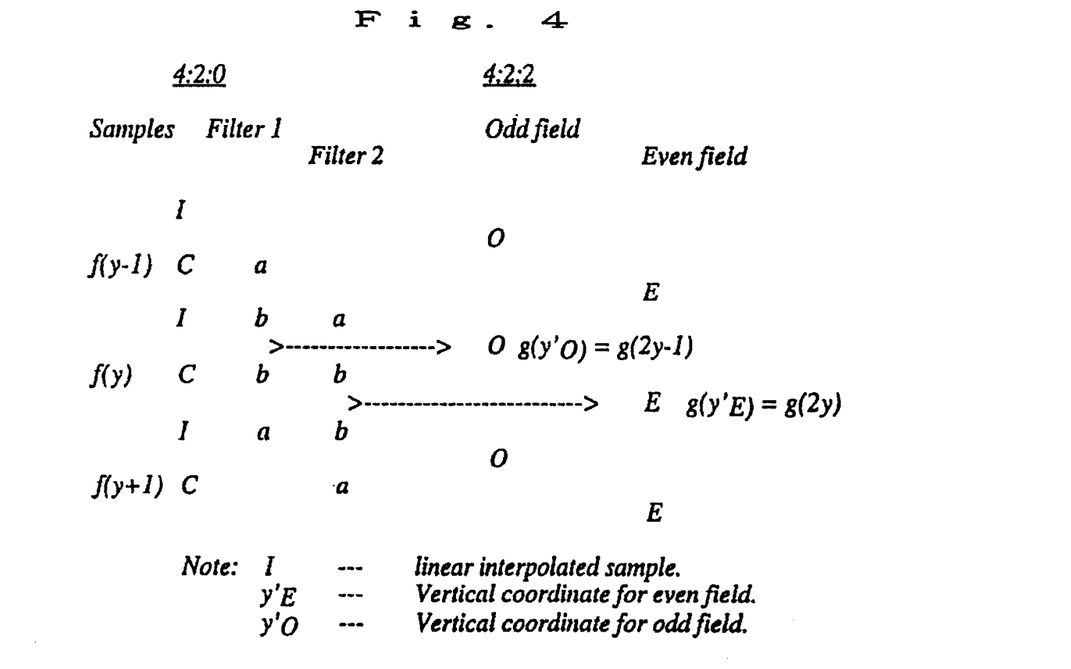
FIG. 4 illustrates the upsampling of a non-interlaced picture. A 4-tap symmetrical filter is used to shift the sample by one half a luma sample distance up or down with respect to the 4:2:0 picture sample f(y).

The upsampling operation from 4:2:0 to 4:2:2 chroma format for non-interlaced picture is shown in FIG. 4. For odd field samples of 4:2:2, they are formed by using Filter 1 to the 4:2:0 samples with the filter positioned half a luma sample distance up with respect to f(y). The I samples are linearly interpolated from their two neighboring samples. The vertical position of g(y'0) is shifted up by ½ luma sample distance with respect to the f(y) in the 4:2:0 picture. Similarly, for the even field samples of 4:2:2, they are formed by using Filter 2 to the 4:2:0 samples with the filter positioned ½ luma sample distance down with respect to the f(y) in 4:2:0 picture. The resulting sample g(y'E) has a vertical position shift of ½ luma sample distance down with respect to the f(y) in the original 4:2:0 picture. In conclusion, each chroma sample in 4:2:0 picture will generate two chroma samples in 4:2:2 picture. One sample is for odd field and is positioned ½ louma sample distance up, the other sample is for even field and is positioned ½ luma sample distance down with respect to the f(y) in the original 4:2:0 picture.

For odd field samples, the linear interpolated sample with phase shifting is given by the following formula:

$$g(y'_o) = f(2y - 1)$$

$$= a*f(y-1) + b*\frac{f(y-1)+f(y)}{2} + b*f(y) + a*\frac{f(y)+f(y+1)}{2}$$

$$= \frac{1}{2}[(2a+b)*f(y-1) + (3b+a)*f(y) + a*f(y+1)]$$

for $(y = 1, 2, 3, \ldots)$

The above formula can be expressed as the following 3-tap filter mask.

| | |
|---|---|
| y − 1 | 2a + b |
| y | 3b + a |
| y + 1 | a |

→ y'0

For even line samples, the linear interpolated sample with phase shifting is given by the following formula:

$$g(y'_E) = f(2y)$$

-continued $$= a*\frac{f(y-1)+f(y)}{2} + b*f(y) + b*\frac{f(y)+f(y+1)}{2} + a*f(y+1)$$

$$= \frac{1}{2}[a*f(y-1) + (3b+a)*f(y) + (2a+b)*f(y+1)]$$

for $(y = 1, 2, 3, \ldots)$

The above formula can be expressed as the following 3-tap filter mask.

| | |
|---|---|
| y − a | a |
| y | 3b + a |
| y + 1 | 2a + b |

→ y'E

2. Interlaced picture

For interlaced picture, the odd and even field chroma samples shall be processed separately since they are formed at different time instance. The odd field sample will be subsampled or upsampled to generate new odd field samples. The even field samples will be subsampled or upsampled to generated new even field samples.

1) 4:2:2 to 4:2:0 subsampling

A. Odd field subsampling

Figure 5:
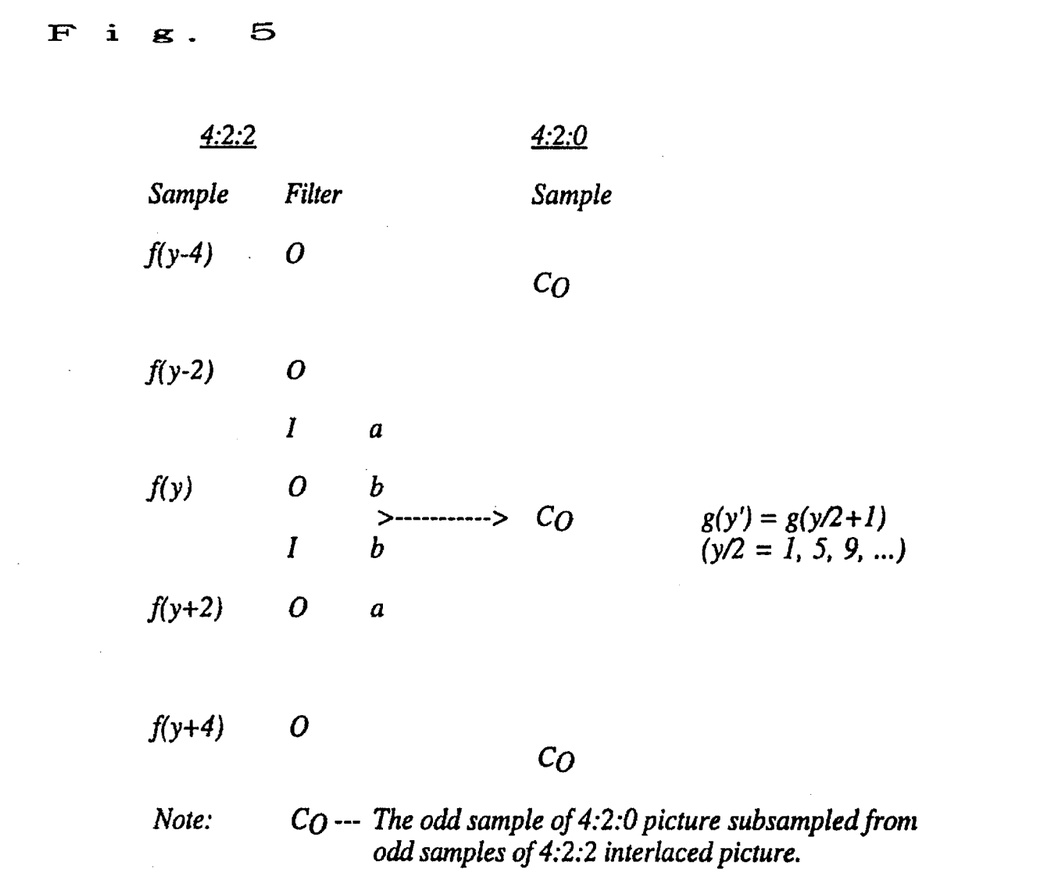
FIG. 5 illustrates the odd field subsampling operation for an interlaced picture. The 4-tap filter is placed half a luma sample down with respect to a 4:2:2 picture sample f(y).

The odd field samples of the 4:2:0 picture are subsampled from the odd field samples of the 4:2:2 picture as shown in FIG. 5. In order to apply the phase shifting filter, I samples are linearly interpolated from their two neighboring odd field samples The filter center is positioned half a luma sample down with respect to the f(y) so that the resulting odd field sample in 4:2:0 picture has half a sample distance down shift with respect to the f(y) in the 4:2:2 picture. The variabley shall take the values that make y/2+1 as odd value. This operation can be described by the following formula:

$$g(y') = g\left(\frac{y}{2} + 1\right)$$

$$= a*\frac{f(y-2)+f(y)}{2} + b*f(y) + b*\frac{f(y)+f(y+2)}{2} + a*f(y+2)$$

$$= \frac{1}{2}[a*f(y-2) + (a+3b)*f(y) + (2a+b)*f(y+2)]$$

for $(y = 1, 5, 9, \ldots)$

This formula is also expressed as the following 3-tap filter mask.

| | |
|---|---|
| y − 2 | a |
| y | a + 3b |
| y + 2 | 2a + b |

→ y'

B. Even field subsampling

Figure 6:
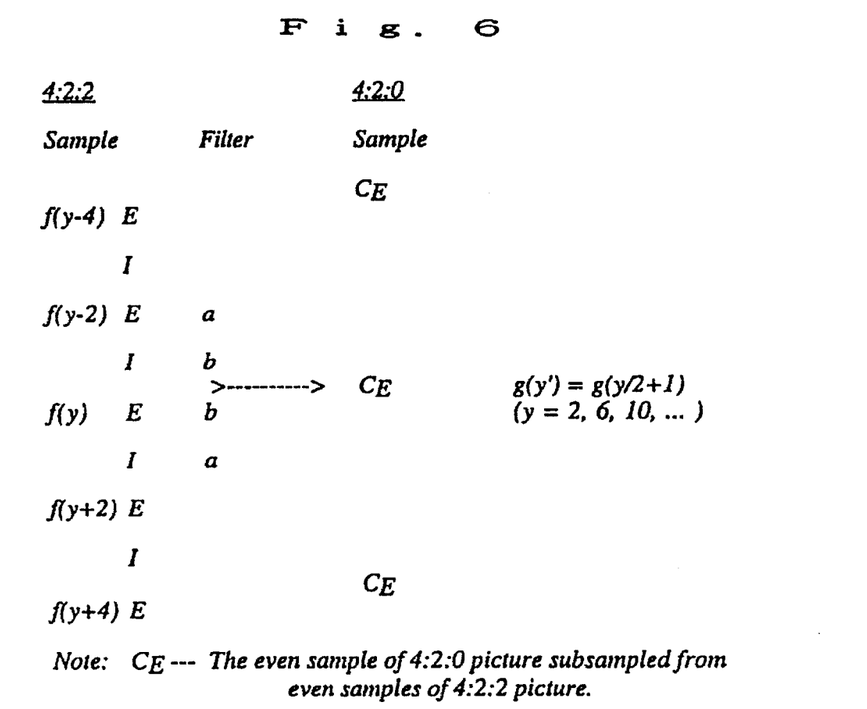
FIG. 6 illustrates the even field subsampling operation for an interlaced picture. The 4-tap filter is placed half a luma sample with respect to a 4:2:2 picture sample f(y).

The even field samples of the 4:2:0 picture are subsampled from the even field samples of the 4:2:2 interlaced picture as shown in FIG. 6. In order to apply the linear phase shifting filter, I samples are linear ly interpolated from their two neighboring even field samples. The filter center is positioned half a luma sample up with respect to f(y) so that the resulting even field sample in 4:2:0 picture has a half sample distance up shift with respect to the f(y) in the 4:2:2 picture. The variable y shall take the value that make y/2+1 as positive even value.

This operation can be described by the following formula:

$$g(y') = g\left(\frac{y}{2} + 1\right)$$

-continued $$= a*f(y-2) + b*\frac{f(y-2)+f(y)}{2} + b*f(y) + a*\frac{f(y)+f(y+2)}{2}$$

$$= \frac{1}{2}[(2a+b)*f(y-2) + (a+3b)*f(y) + a*f(y+2)]$$

for $(y = 2, 6, 10, \ldots)$

This can be expressed as the following 3-tap filter mask.

| | |
|---|---|
| $y-2$ | $2a+b$ |
| $y$ | $a+3b$ → $y'$ |
| $y+2$ | $a$ |

It can be seen that the subsampling filter for even field is the mirror of the subsampling filter for the odd field. This presents a merit that only one set of coefficients of the two filters needs to be stored for the implementation of the pre-filtering operation.

4:2:0 to 4:2:2 upsampling

A. Odd field upsampling

Figure 7:
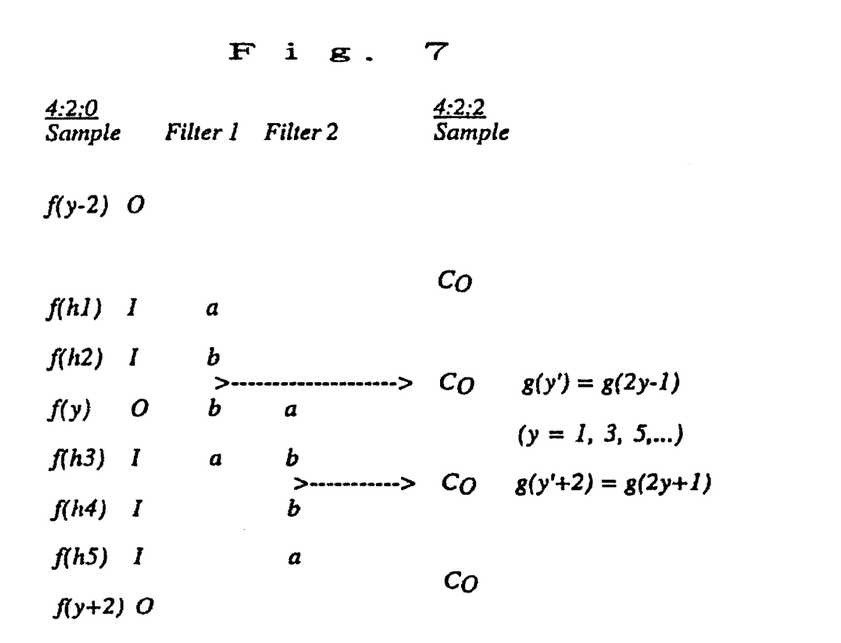
FIG. 7 illustrates the odd field upsampling operation for an interlaced picture. Two filters, Filter 1 and Filter 2, are used. The filters use the same filter samples but different positions with respect to a 4:2:0 picture sample f(y). Filter 1 produces the odd line samples of the odd Field while the Filter 2 produces the even line samples of the odd field.

The odd samples of 4:2:2 interlaced picture are upsampled from the odd samples of 4:2:0 picture as shown in FIG. 7. One odd sample in the 4:2:0 picture will generate two odd samples in 4:2:2 picture. Filter 1 and Filter 2 are used on the 4:2:0 picture with the position aligned as shown in FIG. 7. The interpolated values I are linearly interpolated from their neighboring odd samples 0. Their values are calculated as follows:

$$f(h1) = \frac{f(y-2)+f(y)}{2}$$

$$f(h2) = \frac{f(h1)+f(y)}{2} = \frac{f(y-2)+3f(y)}{4}$$

$$f(h4) = \frac{f(y)+f(y+2)}{2}$$

$$f(h3) = \frac{f(y)+f(h4)}{2} = \frac{3(f)+f(y+2)}{4}$$

$$f(h5) = \frac{f(h4)+f(y+2)}{2} = \frac{f(y)+3f(y+2)}{4}$$

The resulting sample g(y') has half a luma sample distance up shifting with respect to f(y). The other resulting sample g(y'+2) has one and a half luma sample distance down shifting with respect to f(y). For the first upsampled sample g(y'), following formula can be used.

$$g(y') = (2y-1)$$

$$= a*f(h1) + b*f(h2) + b*f(y) + a*f(h3)$$

$$= \frac{(2a+b)*f(y-2) + (5a+7b)*f(y) + a*f(y+2)}{4}$$

for $(y = 1, 3, 5, \ldots)$

This can be expressed as the following 3-tap filter mask.

| | |
|---|---|
| $y-2$ | $2a+b$ |
| $y$ | $5a+7b$ → $y'$ |
| $y+2$ | $a$ |

For the second upsampled sample g(y'+2), following formula can be used.

$$g(y'+2) = g(2y+1)$$

-continued $$= a*f(y) + b*f(h3) + b*f(h4) + a*f(h5)$$

$$= \frac{[5*f(y) + 3*f(y+2)]*(a+b)}{4}$$

for $(y = 1, 3, 5, \ldots)$

This equation can be expressed as a 2-tap filter mask as follow

| | |
|---|---|
| $y$ | $5$ |
| $y+2$ | $3$ → $y'$ |

This filter mask is independent of the values of a and b. It is a good feature since the filter is fixed though different values of a and b might be used in different implementation.

B. Even field upsampling

Figure 8:
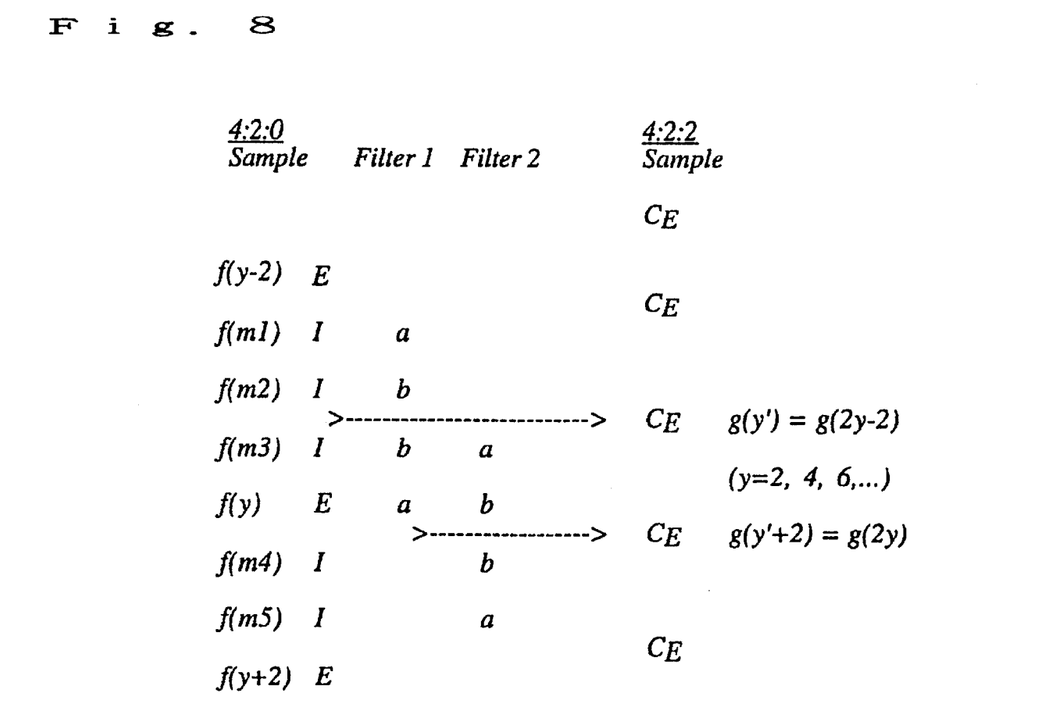
FIG. 8 illustrates the even field upsampling operation for an interlaced picture. Two filters, Filter 1 and Filter 2, are used. The filters use the same filter samples but different positions with respect to a 4:2:0 picture sample f(y). Filter 1 produces the odd line samples of the even field while the Filter 2 produces the even line samples of the odd Field.

The even field samples of 4:2:2 interlaced picture are upsampled from the even samples of 4:2:0 picture as shown in FIG. 8. One even sample in the 4:2:0 picture will generate two even samples in 4:2:2 picture.

Filter 1 and Filter 2 are used on the 4:2:0 picture with the position aligned as shown in FIG. 8. The interpolated values I are linearly interpolated from their neighboring even samples E. Their values are calculated as follows:

$$f(m2) = \frac{f(y-2)+f(y)}{2}$$

$$f(m1) = \frac{f(y-2)+f(m2)}{2} = \frac{3f(y-2)+f(y)}{4}$$

$$f(m3) = \frac{f(m2)+f(y)}{2} = \frac{f(y-2)+3f(y)}{4}$$

$$f(m5) = \frac{f(y)+f(y+2)}{2}$$

$$f(m4) = \frac{f(y)+f(m5)}{2} = \frac{3f(y)+f(y+2)}{4}$$

The resulting sample g(y') has a half luma sample up shifting with respect to f(y). The other resulting sample g(y'+2) has one and a half sample down shifting with respect to the f(y). For the first upsamples sample g(y'), following formula can be used.

$$g(y') = g(2y-2)$$

$$= a*f(m1) + b*f(m2) + b*f(m3) + a*f(y)$$

$$= \frac{[3f(y-2) + 5f(y)]*(a+b)}{4}$$

for $(y = 2, 4, 6, \ldots)$

This filter can be expressed as the following 2-tap filter mask.

| | |
|---|---|
| $y-2$ | $3$ |
| | → $2y-2$ |
| $y$ | $5$ |

This filter mask is also independent of the values of a and b. Furthermore, it is the mirror of filter for f(2y+1) so that it can simplify the implementation.

For the second upsamples sample g(y'+2), following formula can be used.

$$g(y'+2) = g(2y)$$
$$= a*f(m3) + b*f(y) + b*f(m4) + a*f(m5)$$
$$= \frac{[a*f(2-y) + (5a+7b)*f(y) + (2a+b)*f(y+2)]}{4}$$

for $(y = 2, 4, 6, \ldots)$

This filter can be expressed as the following 3-tap filter mask.

$$\begin{array}{ll} y-2 & a \\ y & 5a+7b \\ y+2 & 2a+b \end{array} \rightarrow 2y$$

This filter is the miriror of the filter used for f(2y−1).

To summarise, we have designed 7 different filters for the conversion between 4:2:2 and 4:2:0 chroma format, which conforms to the MPEG-2 chroma format definitions. Among the 7 filters, three pairs are in mirror relations with respect to the center of their filter samples.

Therefore, there are only 4 different filters that could satisfy all cases of chroma format conversions between 4:2:2 and 4:2:0.

EMBODIMENTS

Figure 9:
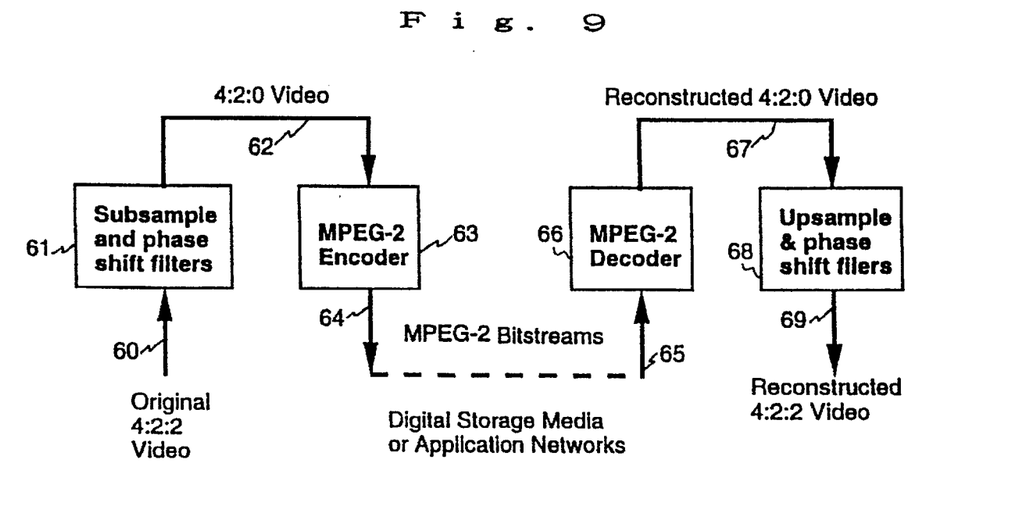
FIG. 9 illustrates the MPEG-2 video coding system diagram where the subsampling and upsampling filters are typically used.

A preferred embodiment of the subsampling and upsampling filters for the chroma format conversion between 4:2:2 and 4:2:0 is shown in FIG. 9, together with an MPEG-2 encoder and decoder to form a video coding system. The original input video signal (60) is in 4:2:2 chroma format.

Figure 10:
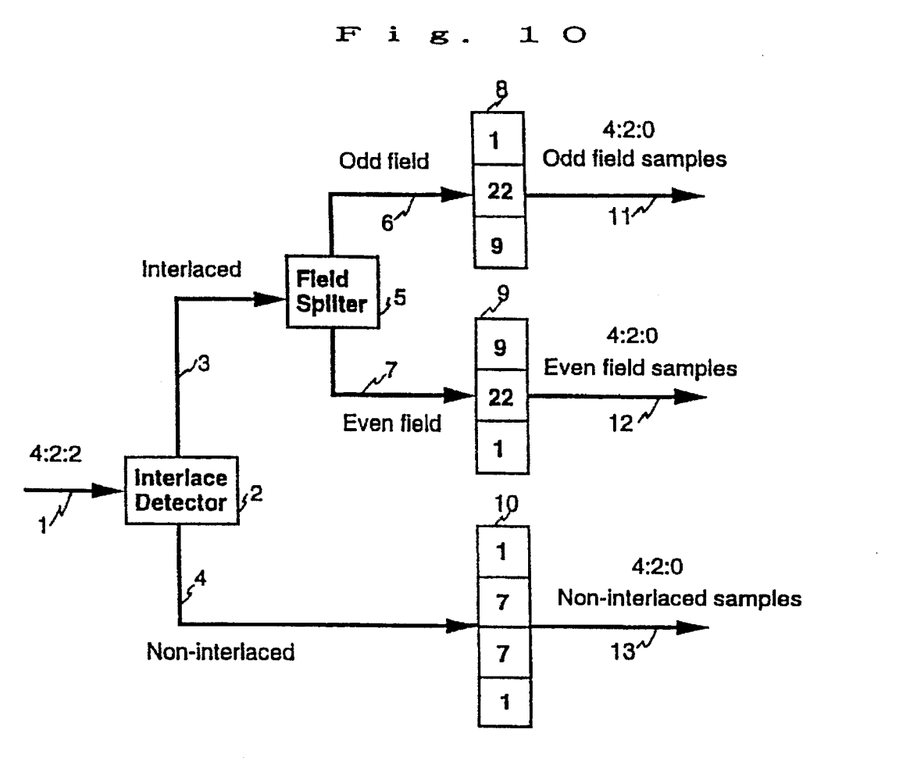
FIG. 10 illustrates the operational diagram of 4:2:2 to 4:2:0 subsampling filter. One 4-tap filter is used for a non-interlaced picture. Two 3-tap mirror filters are used for an interlaced picture.

It is converted to 4:2:0 chroma format (62) by the designed subsampling and phase shifting filters (61) as described in FIG. 10. The 4:2:0 video (62) is then encoded by an MPEG-2 encoder (63) to generate MPEG-2 video bitstream (64). The bitstream (64) is either stored in a digital storage media or transmitted through a digital network. The received bitstream (65) is then decoded by an MPEG-2 decoder (66) to output the reconstructed 4:2:0 chroma format video signal (67). This signal (67) is finally converted back to 4:2:2 chroma format video signal (69) by the upsampling and phase shifting filters (68), which is described in FIG. 11. In this embodiment, the basic 4-tap filter is chosen to be [1 7 7 1], i.e., a=1, b=7.

FIG. 10 shows the operational diagram of 4:2:2 to 4:2:0 subsampling process. The input (1) is the 4:2:2 chroma samples conforming to the CCIR601 specification. The chroma picture is first detected by an Interlace Detector (2) and directed to different subsampling filters designed for interlaced and non-interlaced picture. If the 4:2:2 picture is non-interlaced, it is linked through line (4) to a 4-tap linear phase FIR filter (10), the output of which is the 4:2:0 chroma samples (13). If the 4:2:2 picture is interlaced, it is linked through line (3) to a Field Spliter (5), where it is split into odd field (6) and even field (7). The odd field samples (6) are subsampled by a 3-tap filter (8), the output of which gives the 4:2:0 odd field sample s (11). The even field samples (7) are subsampled by a 3-tap filter (9), the output of which gives the 4:2:0 even field samples (12). For MPEG-2 coding process, the split odd and even 4:2:0 can be directly used without being merged as one picture. This will simplify the subsequent coding process.

Figure 11:
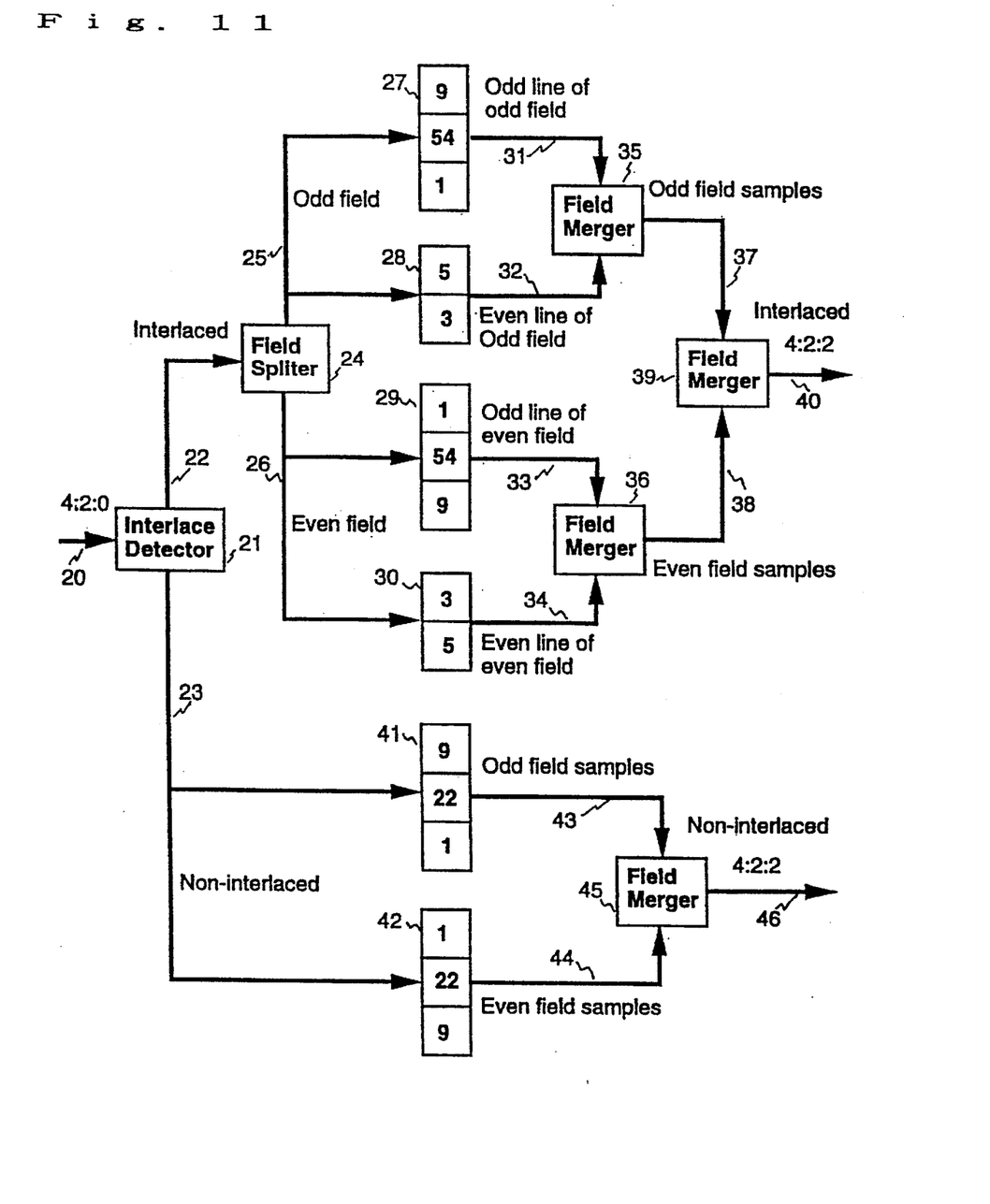
FIG. 11 shows the operational diagram of 4:2:2 to 4:2:0 upsampling filter. Two 3-tap mirror filters are used for a non-interlaced picture. Another two 3-tap mirror filters and two 2-tap mirror filters are used for an interlaced picture.

FIG. 11 shows the operational diagram to upsamples the 4:2:0 to 4:2:2 chroma format. The input (20) is the 4:2:0 chroma picture. It is first detected by an Interlace Detector (21). If the input is interlaced picture, it is linked through line (22) to a Field Spliter (24), where it is split into odd field (25) and even field (26). The odd field (25) is then upsampled by a 3-tap filter (27) to generated odd lines of odd field (31) and by a 2-tap filter (28) to generate even lines of odd field (32). Both of these outputs are sent to a Field Merger (35), the output of which gives the odd field samples (37). The even field (26) is similarly sent to a 3-tap filter (29) and a 2-tap filter (30). The filter (29) outputs the odd lines of even field (33) and the filter (30) outputs the even lines of even field (34). Outputs of line (33) and (34) are then sent to a Field Merger (36) where they are merged to form the even field samples (38). The odd field samples (37) and the even field samples (38) are finally merged by another Field Merger (39) to generate the complete interlaced 4:2:2 chroma picture (40).

If the input is from non-interlaced picture, it is sent thorugh line (23) to two 3-tap filter (41) and (42). The filter (41) generates the odd field samples (43) and the filter (42) generates the even field samples (44). They are then merged by a Field Merger (45) to form a complete non-interlaced 4:2:2 chroma picture.

The Interlace Detector (2) can be implemented simply by statistical analysis of input 4:2:2 picture data. The other Interlace Detector (21) can be implemented from the picture coding parameters from the decoded bitstream.

As mentioned at the beginning, there is a set of filters defined in the test model 5 of the MPEG-2 project for the chroma format conversion bet-ween 4:2:2 and 4:2:0. Unfortunately they don't conform to the final definition of the MPEG-2 4:2:0 chroma format. Nevertheless, we take this set of filters as a reference to evaluate the effects of the invention.

The set of filters is for interlaced picture conversion and is given in Table 1 with corresponding filters designed from this invention. In the table, the filters from this invention are called New filters while filters from the test model 5 are called TM5 filters.

TABLE 1

Pre- and Post-Filters from TM5 and the invention

|  |  | Odd Field | | Even Field | |
| --- | --- | --- | --- | --- | --- |
|  |  | Odd Line | Even Line | Odd Line | Even Line |
| Pre-Filter | TM5 | [−29, 0, 88, 138, 88, 0, −29]//256 | | [1, 7, 7, 1]//16 | |
|  | New | [1, 22, 9]//32 | | [9, 22, 1]//32 | |
| Post-Filter | TM5 | Null | [1, 1]//2 | [3, 1]//4 | [1, 3]//4 |
|  | New | [9, 54, 1]//64 | [5, 3]//8 | [3, 5]//8 | [1, 54, 9]//64 |

Note: The symbol stands for integer divide operation.

From the filter masks of the two set of filters given in Table 1, it can be seen that the new prefilters are easier in implementation in the sense of shorter filter length. For the postfilter, the new filters are a little bit longer than the TM5. The performance of these two sets of filters applied to one frame of "flower" sequence in terms of SNR are given in Table 2. The test is done in such a way that an original 4:2:2 flower frame is first subsampled to 4:2:0 . Then the 4:2:0 picture is directly upsampled to reconstruct the 4:2:2 picture. The reconstruction error is taken as the noise to compare with the original 4:2:2 picture. The results are shown in SNR (dB) by Table 2.

TABLE 2

SNR measure of the performance of the two sets of filters

| SNR (dB) | | Post-Filter | |
| --- | --- | --- | --- |
| | | TM5 | New |
| Pre-Filter | TM5 | 42.7 | |
| | New | | 43.9 |

The SNR measures show that the reconsturcted 4:2:2 picture from the new set of filters has a SNR improvement around 1.2 dB. When cascade coding is used, the quality improvement could be expected even high since the results from the new filters conform to the definition of the said chroma formats specified by the MPEG-2 international standard.

What is claimed is:

1. A chroma format conversion method comprising the steps of:
    determining whether chroma format data to be converted is interlaced data or not interlaced data,
    converting, when the chroma format data is non-interlaced data, the chroma format data using a filter for non-interlaced data,
    determining, when the chroma format data is interlaced data, whether the chroma format data is odd field data or even field data,
    converting, when the chroma format data is odd field data, the chroma format data using a filter for odd field, and
    converting, when the chroma format data is even field data, the chroma format data using a filter for even field,
    wherein the filter for non-interlaced data, the filter for odd field, and the filter for even field convert 4:2:2 chroma format data to 4:2:0 chroma format data using subsampling and phase shifting operations.

2. The chroma format conversion method according to claim 1, wherein the phase shifting operations are performed using a linear phase FIR filter which has symmetrical filter samples where an even-tap linear phase FIR filter is used to provide half a sample distance phase shift.

3. The chroma format conversion method according to claim 2, wherein the even-tap linear phase FIR filter has 4-taps that can be expressed by a general form (a, b, b, a) where a and b are two arbitrary integer numbers, and the even-tap linear phase FIR filter is used for the chroma format conversion.

4. The chroma format conversion method according to claim 1, wherein the filter for non-interlaced data is a subset of FIR filters and the subset comprises one which is a subsampling filter.

5. The chroma format conversion method according to claim 4, wherein the subsampling filter is a 5-tap linear phase FIR filter (a, b, b, a) and the subsampling filter is positioned half a luma sample distance down with respect to a sample within a 4:2:2 chroma format picture.

6. The chroma format conversion method according to claim 1, wherein the filter for odd field and the filter for even field are subsets of FIR filters and the subsets comprise two subsampling filters.

7. The chroma format conversion method according to claim 6, wherein the two subsampling filters are a first 3-tap filter and a second 3-tap filter where the first 3-tap filter has a general form (a, 3b+a, 2a+b) which is used to subsample odd samples of the 4:2:2 chroma format data to produce odd samples of the 4:2:0 chroma format data and the second 3-tap filer has a general form (2a+b, 3b+a, a) which is used to subsample even samples of the 4:2:2 chroma format data to produce even samples of the 4:2:0 chroma format data, the first 3-tap filter is a mirror of the second 3-tap filter.

8. A chroma format conversion method comprising the steps of:
    determining whether chroma format data to be converted is interlaced data or not interlaced data,
    converting, when the chroma format data is non-interlaced data, the chroma format data using a filter for non-interlaced data,
    determining, when the chroma data is interlaced data, whether the chroma format data is odd field data or even field data,
    converting, when the chroma format data is odd field data, the chroma format data using a filter for odd field, and
    converting, when the chroma format data is even field data, the chroma format data using a filter for even field,
    wherein the filter for non-interlaced data, the filter for odd field, and the filter for even field convert 4:2:0 chroma format data to 4:2:2 chroma format data using upsampling and phase shifting operations.

9. The chroma format conversion method according to claim 8, wherein the phase shifting operations are performed using a linear phase FIR filter which has symmetrical filter samples where an even-tap linear phase FIR filter is used to provide half a sample distance phase shift.

10. The chroma format conversion method according to claim 9, wherein the even-tap linear phase FIR filter has 4-taps that can be expressed by a general form (a, b, b, a) where a and b are arbitrary integer numbers, and the even-tap linear phase FIR filter is used for the chroma format conversion.

11. The chroma format conversion method according to claim 8, wherein the filter for non-interlaced data is a subset of FIR filters and the subset comprises two upsampling filters.

12. The chroma format conversion method according to claim 11, wherein the upsampling filters are 3-tap filters and a first filter is expressed by the general form (2a+b, 3b+a, a) for generating odd field samples of a 4:2:2 format picture and a second filter is expressed by the general form (a, 3b+a, 2a+b) for generating even field samples for the 4:2:2 format picture, the first and second filters have a mirror relation with respect to their center sample.

13. The chroma format conversion method according to claim 8, wherein the filter for odd field and the filter for even field are subsets of FIR filters and the subsets comprise four upsampling filters.

14. The chroma format conversion method according to claim 13, wherein the four upsampling filters comprise two filters for odd field upsampling and two filters for even field upsampling.

15. The chroma format conversion method according to claim 14, wherein the two filters for odd field upsampling are a 3-tap filter having a general form (2a+b, 5a+7b, 2a+b) and a 2-tap filter having a general form (3, 5).

16. The chroma format conversion method according to claim 15, wherein the two filters for even field upsampling are a 3-tap filter having a general form (a, 5a+7b, 2a+b) and a 2-tap having a general form (3, 5).

17. A chroma format conversion device comprising:
    determining means for determining whether chroma format data to be converted is interlaced data or not interlaced data, and converting means for:
- (a) converting, when the chroma format data is non-interlaced data, the chroma format data using a filter for non-interlaced data,
- (b) determining, when the chroma format data is interlaced data, whether the chroma format data is odd field data or even field data,
- (c) converting, when the chroma format data is odd field data, the chroma format data using a filter for odd field, and
- (d) converting, when the chroma format data is even field data, the chroma format data using a filter for an even field, wherein the filter for non-interlaced data, the filter for odd field, and the filter for even field convert 4:2:2 chroma format data to 4:2:0 chroma format data using subsampling and phase shifting operations.

18. A chroma format conversion device comprising:

determining means for determining whether chroma format data to be converted is interlaced data or not interlaced data, converting means for:
- (a) converting, when the chroma format data is non-interlaced data, the chroma format data using a filter for non-interlaced data,
- (b) determining, when the chroma format data is interlaced data, whether the chroma format data is odd field data or even field data,
- (c) converting, when the chroma format data is odd field data, the chroma format data using a filter for odd field, and
- (d) converting, when the chroma format data is even field data, the chroma format data using a filter for even field, wherein the filter for non-interlaced data, the filter for odd field, and the filter for even field convert 4:2:0 chroma format data to 4:2:2 chroma format data using upsampling and phase shifting operations.

* * * * *